United States Patent [19]

Iwata et al.

[11] 4,370,963
[45] Feb. 1, 1983

[54] IGNITION TIMING CONTROL SYSTEM FOR INTERNAL COMBUSTION ENGINE

[75] Inventors: Toshio Iwata; Kiyoshi Ookawa, both of Himeji, Japan

[73] Assignee: Mitsubishi Denki Kabushiki Kaisha, Tokyo, Japan

[21] Appl. No.: 152,114

[22] Filed: May 20, 1980

[30] Foreign Application Priority Data

May 25, 1979 [JP] Japan .................................. 54-66011

[51] Int. Cl.$^3$ .............................................. F02P 5/04
[52] U.S. Cl. ...................................... 123/425; 123/435
[58] Field of Search ....................... 123/425, 435, 436

[56] References Cited

U.S. PATENT DOCUMENTS

| | | | |
|---|---|---|---|
| 2,407,652 | 9/1946 | Costa | 123/425 |
| 3,789,816 | 2/1974 | Taplin | 123/436 |
| 4,099,493 | 7/1978 | Latsch | 123/436 |
| 4,106,447 | 8/1978 | West | 123/425 |
| 4,111,035 | 9/1978 | West | 123/425 |
| 4,133,475 | 1/1979 | Harned | 123/425 |

FOREIGN PATENT DOCUMENTS

| | | | |
|---|---|---|---|
| 54-152717 | 12/1979 | Japan | 123/425 |
| 55-114878 | 4/1980 | Japan | 123/425 |
| 55-151171 | 11/1980 | Japan | 123/425 |
| 2055964 | 3/1981 | United Kingdom | 123/425 |

*Primary Examiner*—Ronald B. Cox
*Attorney, Agent, or Firm*—Wenderoth, Lind & Ponack

[57] ABSTRACT

An acceleration sensor senses mechanical noise components and a knock signal originating from an internal combination engine. The knock signal is separated from the attenuated noise components and compared with a DC voltage due to the latter to form pulses. The pulses integrated by an integrator are applied to a phase shifter to retard an ignition time. During the acceleration of the engine, a switch is opened in response to a pressure in an intake manifold in excess of a predetermined magnitude to cause an acceleration compensation circuit to decrease the charging time constant of the integrator resulting in an increase in retard of the ignition time point.

4 Claims, 6 Drawing Figures

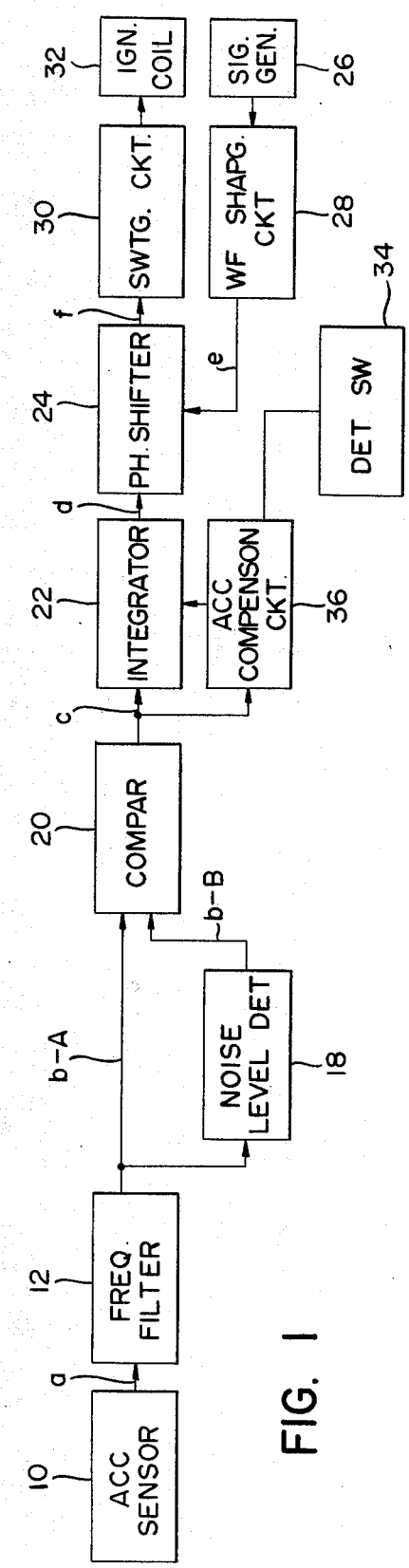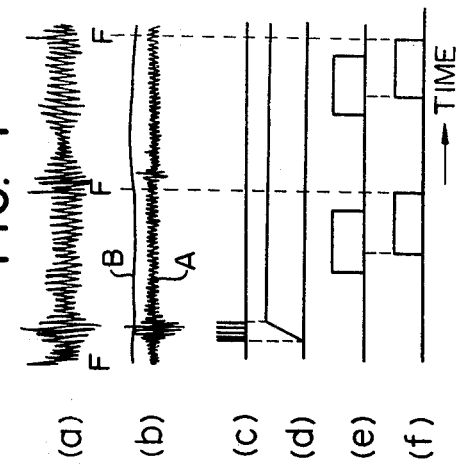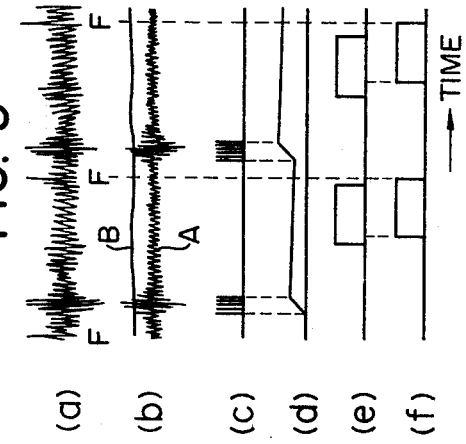

4,370,963

IGNITION TIMING CONTROL SYSTEM FOR INTERNAL COMBUSTION ENGINE

BACKGROUND OF THE INVENTION

This invention relates to an ignition timing control system for an internal combustion engine.

The ignition timing of internal combustion engines is controlled so as to maximize the efficiency of the engine with respect to the mode of operation thereof. It is generally desirable to control the ignition timing so that the particular internal combustion engine approaches a minimum advance for the best torque which may be abbreviated to "MBT" as close as possible within the range in which knocking is not caused in the engine. However, ignition timing control systems previously provided on internal combustion engines have been, in many cases, of the mechanical type and the ignition advance angle characteristics thereof have not been stable with respect to deviations of dimensions and secular changes of components involved. Therefore, the ignition timing has been actually controlled to retard substantially behind an ignition time point giving the desirable advance angle characteristic in order to prevent the occurrence of knocking. In this case the engine deteriorates in efficiency. Also even when ignition timing control systems free from both deviations of dimensions and secular changes as described above are employed, knocking occurring in an associated internal combustion engine depends upon an inlet air temperature and an inlet humidity of the engine and further upon an air fuel ratio thereof, etc. Accordingly, if the ignition timing could be controlled so as not to cause knocking in the engine in some mode of operation, there might be a fear that knocking would be caused in the engine in another mode of operation.

Therefore by sensing knocking and controlling the ignition timing to retard upon the occurrence of knocking, the ignition timing can be adjusted so that knocking is scarcely caused even though an error would occur in the ignition advance angle characteristic due to the deviations as described above of mechanical aparatus and differences between the modes of operation. When internal combustion engines are operated in the steady state or when they are slowly accelerated or decelerated, the engines do not sharply vary in the operating conditions and therefore knocking can be stably controlled. However, upon the rapid acceleration of the engines, the air fuel ratio and the ignition time point are rapidly and substantially changed. Accordingly extreme knocking is apt to be extremely caused in the engines and the intensity of knocking become very high. As a result, it has been difficult to suppress quickly knocking by means of the conventional control.

Accordingly, it is an object of the present invention to provide a new and improved ginition timing control system for controlling ignition timing of an internal combustion engine in accordance with a knock signal originating from the engine so that, upon the rapid acceleration of the engine, a retard angle for the knocking control is increased, thereby to suppress knocking quickly.

SUMMARY OF THE INVENTION

The present invention provides an ignition timing control system for an internal combustion engine comprising knocking detector means for detecting knocking of an internal combustion engine, reference ignition timing signal generator means for generating a reference ignition timing signal, phase shifting means responsive to an output from the knocking detector means to control the reference ignition timing signal to cause the phase thereof to retard, an ignition coil, switching means for intermitting a flow of current to the ignition coil in synchronization with an output from the phase shifting means, and acceleration compensation means for increasing the retard angle of the reference ignition timing signal upon the acceleration of the internal combustion engine.

There may preferably be provided a switch connected to the acceleration comprensation means to be operated in response to at least a pressure in an intake manifold operatively connected to the internal combustion engine or a valve opening degree of a throttle valve operatively connected thereto in excess of a predetermined magnitude thereof.

BRIEF DESCRIPTION OF THE DRAWINGS

The present invention will become more readily apparent from the following detailed description taken in conjunction with the accompanying drawings in which:

FIG. 1 is a block diagram of one embodiment of an engine ignition timing control system of the present invention;

FIG. 2 is a graph illustrating waveforms developed at various points in the arrangement shown in FIG. 1 and put in the mode of operation in which no knocking is caused in an associated internal combustion engine;

FIG. 3 is a graph similar to FIG. 2 but illustrating the mode of operation in which knocking is caused in the engine;

FIG. 4 is a graph similar to FIG. 2 but illustrating the mode of operation in which, knocking is caused in the engine upon the rapid acceleration thereof;

DESCRIPTION OF THE PREFERRED EMBODIMENT

Figure 5:
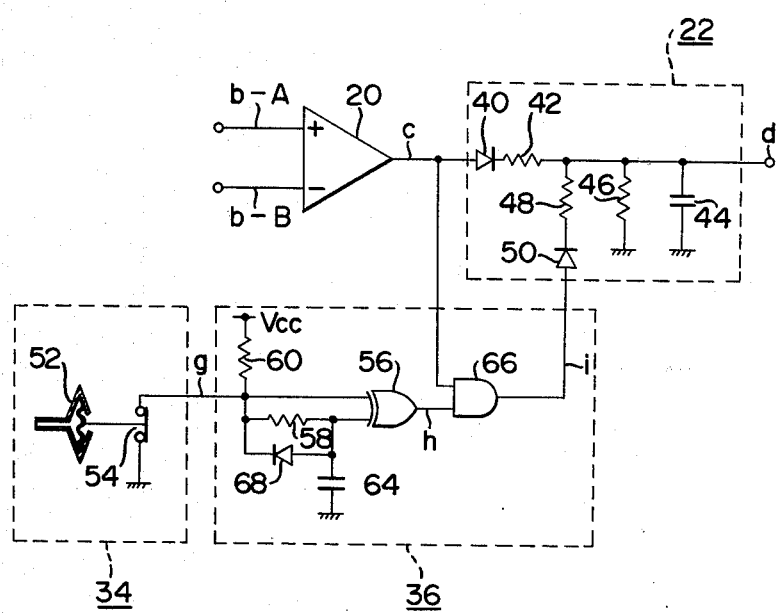
FIG. 5 is a circuit diagram of the details of one portion of the arrangement shown in FIG. 1.

Referring now to FIG. 1 of the drawings, there is illustrated one embodiment of an engine ignition timing control system of the present invention. The arrangement illustrated comprises an acceleration sensor 10 mounted on an internal combustion engine involved (not shown) to sense an acceleration of a vibration of the engine, and a filter 12 connected to the acceleration sensor 10. The acceleration sensor 10 produces an output including noise components due to the vibration of the engine and a knock signal originating from knocking occurring in the engine, if present, and the filter 12 is operative to prevent the noise components from passing through. The filter 12 may be formed of a frequency filter for preventing signals other than those having a predetermined frequency characteristic from passing therethrough or a gate filter for preventing the passage of signals therethrogh for predetermined time intervals or the like.

The filter 12 includes an output connected to both a noise level detector 18 and to a comparator 20 to which the output of the noise level detector 18 is also connected. The noise level detector 18 is operative to detect the level of noise signals due to mechanical vibrations of the engine and the comparator 20 is operative to compare an output voltage from the filter 12 with that from the noise level detector 18 to generate knock detected pulses.

Thus the filter 12, the noise level detector 18 and the comparator 20 form knocking detector means for detecting knocking of the engine.

Then an integrator 22 is operative to integrate the knock detected pulses from the comparator 20 to produce an integrated voltage dependent upon an intensity of the detected knocking. A phase shifter 24 is connected to the integrator 22 and is operative to shift the phase of a reference ignition signal toward the retard side in response to the integrated voltage from integrator 22.

As shown in FIG. 1, a signal generator 26 is connected to a waveform shaping circuit 28 subsequently connected to the phase shifter 24. The signal generator 26 generates an ignition signal in accordance with a predetermined ignition advance angle characteristic. The waveform shaping circuit 28 shapes the waveform of the ignition signal from the signal generator 26 into a reference ignition signal and simultaneously controls a dwell angle through which a current flows through an ignition coil 32. A switching circuit 30 has an input connected to the phase shifter 24 and an output connected to the ignition coil 32 to cause the power supply to the ignition coil 32 to intermit in response to an output signal from the phase shifter 24.

The arrangement comprises further a detection switch 34 operated due to the detection of a pressure in an intake manifold (not shown) operatively connected to the engine (not shown) and an acceleration compensation circuit 36 having an input connected to the detection switch 34. The acceleration compensation circuit 36 includes also another input connected to the comparator 20 and an output connected to the integrator 22. The acceleration compensation circuit 36 is responsive to the operation of the detection switch 34 to shorten a charging time constant of the integrator 22.

The operation of the arrangement shown in FIG. 1 will now be described with reference to FIGS. 2, 3 and 4. FIG. 2 shows waveforms developed at various points in the arrangement of FIG. 1 when knocking is not quite caused in an internal combustion engine involved, while FIG. 3 shows waveforms developed at the same points as those specified in FIG. 2 when knocking is caused in the engine. Also FIG. 4 shows waveforms developed at those points when knocking is caused in the engine upon the abrupt acceleration thereof.

The engine is rotated to cause the rotation signal generator 26 to generate an ignition signal in accordance with the predetermined ignition timing characteristic. The waveform shaping circuit 28 shapes the waveform of the ignition signal into a switching pulse having a desired dwell angle. This switching pulse drives the switching circuit 30 through the phase shifter 24 to cause a flow of current to the ignition coil 32 to intermit. Upon interrupting this current, an ignition voltage induced across the ignition coil 32 ignites and operates the engine. During the operation thereof, the engine causes vibrations which are, in turn, detected by the acceleration sensor 10.

Without knocking caused in the engine, vibrations thereof are not caused from knocking, but the output signal from the acceleration sensor 10 includes mechanical noise and ignition noise passing through the signal transfer path at each ignition time point F as shown at waveform a in FIG. 2. By passing that output signal through the filter 12, signal components due to the mechanical noise are suppressed as shown at waveform b, A in FIG. 2. This waveform is developed on a lead extending from the filter 12 and labelled b-A. On the other hand, the noise level detector 18 is responsive to a change in peak value of the output signal from the filter 12 to generate a DC voltage having a value somewhat higher than the peak value of the mechanical noise components. It is here to be noted that the noise level detector 18 has such characteristic that the detector is operative in response to a relatively slow change in peak value of usual mechanical noise components. This DC voltage is shown at waveform b, B in FIG. 2. This waveform is developed on a lead extending from the detector 18 and labelled b-B. As shown at waveforms b, A and b, B in FIG. 2, the output from the noise level detector 18 is higher than the mean peak value of the output from the filter 12 and therefore the comparator 20 compares the two with each other to provide a null output as shown in FIG. 2, c. As a result, the noise signals are entirely removed.

Under these circumstances, an output voltage from the integrator 22 or on a lead d (see FIG. 1) remains null as shown in FIG. 2, d and a phase angle shifted by the phase shifter 24 becomes null. That is, a difference in phase between the input and output is null. Accordingly, a current flowing through the ignition coil 30 is turned on and off in phase with the reference ignition signal from the waveform shaping circuit 28 (see waveform e, FIG. 2) as illustrated at waveform f in FIG. 2. As a result, the ignition time point remains unchanged from the reference ignition time point F.

Upon the occurrence of knocking, the output signal from the acceleration sensor 10 includes, in addition to the noise components as described above in conjunction with the waveform a shown in FIG. 2, a knock signal developed with some time delay relative to each ignition time point F as shown at waveform a in FIG. 3. After having passed through the filter 12, the knock signal is scarcely attenuated and the noise signals are considerably attenuated as shown at waveform b, A in FIG. 3. This waveform b, A includes high knock signals superposed on the attenuated machanical noise components. As those knock signals leaving the filter 12 are sharp in rise, a DC voltage level (see waveform b, B, FIG. 3) delivered from the noise level detector 18 lags in response with respect to the knock signals.

As a result, the two waveforms b, A and b, B shown in FIG. 3 are applied to the comparator 20 and therefore the output of the comparator 20 has knock detected pulses developed thereat as shown at waveform c in FIG. 3. Then the integrator 22 integrates the knock detected pulses into an integrated voltage as shown at waveform d in FIG. 3.

The phase shifter 24 responds to the integrated voltage to shift the phase of the reference ignition signal from the waveform shaper circuit 28 to the retard side (see waveforms e and f FIG. 3). This results in the output from the phase shifter 24 having its phase retarded behind that of the reference ignition signal from the waveform shaper circuit 28. This output with a retarded phase drives the switching circuit 30. Accordingly, the ignition time point retards, whereby knocking ceases to occur, thus resulting in a knocking free state.

From the foregoing it is seen that the resulting control system effects the closed loop control conducted with the engine, the detection of knocking of the engine, the ignition timing control and the engine in the named order. In the control system a control point is settled to a balanced retard angle point where a voltage charging the integrator 22 balances that discharged therefrom as determined by the output pulses from the comparator 20 resulting from the occurrence of knocking. Upon the engine abruptly accelerating, the operating conditions thereof such as the air fuel ratio, the ignition time point thereof, etc. are an unstable state. Therefore extreme knocking is apt to occur in the engine, so that, even though the ignition time point would be caused to retard somewhat by controlling the retard angle in the steady-state operation of the engine, as shown in FIG. 3, knocking continues to occur in the engine. This results in the impossibility of suppressing immediately knocking.

Under these circumstances, a pressure in the intake manifold (not shown) operatively connected to the engine is detected so that the detection switch 34 is put in its open position in response to the detected pressure in excess of a predetermined magnitude thereof or to a rate of rise of the pressure exceeding a predetermined magnitude thereof. This opening of the detection switch 34 causes the acceleration compensation circuit 36 to decrease a charging time constant of the integrator 22 whereby, upon the occurrence of knocking, the integrator 22 is rapidly charged to rise quickly in output voltage, as shown at waveform d in FIG. 4. As a result, the ignition time points greatly retarded as shown at waveform f in FIG. 4. This results in the immediate suppression of knocking.

The comparator 20, the integrator 22, the detection switch 34 and the acceleration compensation means 36 in combination can be of a circuit configuration as shown in FIG. 5. In the arrangement illustrated the comparator 20 is shown as comprising a pair of positive and negative inputs connected to the leads b-A and b-B respectively and an output connected to the lead c subsequently connected to the integrator 22.

The integrator 22 includes a semiconductor diode 40 connected at the anode electrode to the lead c and at the cathode electrode to a resistor 42 which is, in turn, connected to the lead d. The lead d is connected to ground through a parallel combination of a capacitor 44 and a resistor 46. The resistor 42 is further connected to a lead i through a series combination of separate resistor 48 and a semiconductor diode 50 including an anode electrode connected to the lead i.

The detection switch 34 is shown in FIG. 5 as including a pressure detector 52 connected to the intake manifold (not shown) and a normally closed switch 54 having one contact connected to ground and the other contact connected via lead g to the acceleration compensation circuit 36.

The acceleration compensation circuit 36 comprises an EXCLUSIVE OR gate 56 including one input connected to a positive terminal $V_{cc}$ through resistors 58 and 60 serially connected to each other and the other input connected to both the lead g and the positive terminal $V_{cc}$ through the resistor 60. A semiconductor diode 68 is connected across the resistor 58 and includes an anode electrode connected to ground through a capacitor 64. Then the EXCLUSIVE OR gate 56 includes an output connected to a lead h subsequently connected to one input of an AND gate 66. The AND gate 66 includes another input connected to the output of the comparator 20 and an output connected to the lead i.

The operation of the arrangement shown in FIG. 5 will now be described in conjunction with FIG. 6 wherein there are illustrated waveforms developed on various leads in the arrangement of FIG. 5.

With the engine operated in the normal mode in which the intake manifold is low in pressure, the pressure detector 52 maintains the switch 54 in its closed position. Therefore the switch 54 delivers an output at its low level to the lead g as shown at waveform g in FIG. 6 with the result that the capacitor 64 is shortcircuited through the diode 68 and the now closed switch 54. Under these circumstances an output from the EXCLUSIVE OR gate 56 is developed at its low level on the lead h (see waveform h, FIG. 6). Thus an output from the AND gate 66 is maintained at its low level.

If, at that time, knock detected pulses (see waveform c, FIG. 6) are generated at the output of the comparator 20 or on the lead c then the capacitor 44 in the integrator 22 is charged through the diode 40 and the resistor 42 alone. Thus waveform d shown in FIG. 6 is developed on the lead d.

On the other hand when the engine is accelerated to increase the pressure in the suction manifold beyond the predetermined magnitude, the pressure detector 52 puts the switch 54 in its open position. The opening of the switch 54 puts an output from the switch 54 at its high level (see waveform g, FIG. 6). This output is developed on the lead g. Accordingly, an output from the EXCLUSIVE OR gate 56 continues to be at its high level (see waveform h, FIG. 6) until the capacitor 44 is charged to a predetermined voltage. This output is developed on the lead h. Therefore it is seen that the EXCLUSIVE OR gate 56, and the resistors 58 and 60 form a timer.

Figure 6:
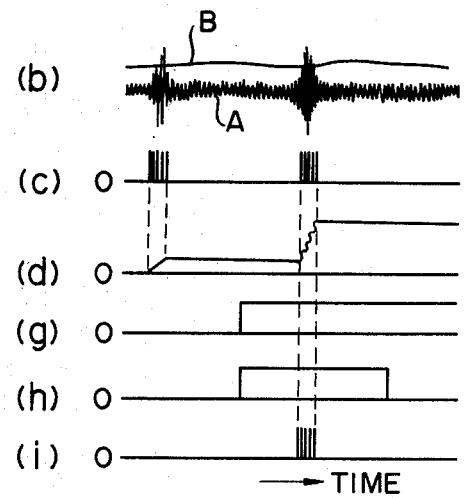
FIG. 6 is a graph illustrating waveforms developed at various points in the arrangement shown in FIG. 5.

At that time, the knock detected pulses developed at the output of the comparator 20 cause the AND gate 66 to produces at the output or on the lead i pulses as shown at waveform i in FIG. 6. Accordingly the capacitor 44 is rapidly charged through the resistors 42 and 48 resulting in an increase in retard angle provided by the phase shifter 24. Consequently the knocking abruptly caused can be immediately suppressed.

The present invention is advantageous in that knocking caused in an internal combustion engine can be effectively controlled by sensing the knocking by an acceleration sensor for sensing an acceleration of a vibration of the engine and causing the ignition time point to retard in accordance with a knock signal resulting from the sensed knocking and upon the rapid acceleration of the engine attended with violent knocking, the latter can be immediately suppressed by increasing the retard of the ignition time point effected in the normal mode of operation of the engine.

While the present invention has been illustrated and described in conjunction with a single preferred embodiment thereof it is to be understood that numerous changes and modifications may be resorted to without departing from the spirit and scope of the present invention. For example, the present invention has been described in conjunction with the detection of a pressure in an intake manifold operatively connected to the engine but it is possible to detect the degree of a throttle valve operatively connected to the engine, for the purpose of operating the acceleration compensation circuit. Also in the example illustrated, the detection switch has been switched in response to the predetermined magnitude of the pressure in the intake manifold. This is true in the case of the detection of the degree of opening of the throttle valve. However, a rate of rise of pressure in the intake manifold or degree of opening of the throttle valve may be detected and the detection switch maybe switched in response to a predetermined magnitude thereof or more.

What we claim is:

1. An ignition timing control system comprising:
reference ignition timing generator means for generating a reference ignition timing signal including reference ignition timing points;
an ignition coil;
switching means responsive to said reference ignition timing generator means for intermitting a current supplied to said ignition coil;
phase shifting means receiving said reference ignition timing signal for transmitting said reference ignition timing signal to said switching means;
knocking detector means for detecting the occurrence of knocking in an internal combustion engine and for generating a pulsed output representative thereof and for generating a null output in the absence of knocking:
integrator means for receiving said outputs from said knocking detector means, for generating a null voltage upon receipt of said null output, and for integrating said pulsed output upon receipt thereof and generating an integrated voltage dependent upon said knock signal components;
said phase shifting means being connected to said integrator means and being responsive to receipt therefrom of said null voltage for transmitting said reference ignition timing signal to said switching means, and said phase shifting means being responsive to receipt from said integrator means of said integrated voltage for retarding the phase of said reference ignition timing signal by an amount dependent upon the level of said integrated voltage;
detection means for detecting abrupt acceleration of the internal combustion engine; and
acceleration compensation circuit means, connected to said integrator means, for, in response to a detection of abrupt acceleration by said detection means, shortening the time constant of said integrator means and rapidly increasing said integrated voltage, and thereby for increasing the amount of retard of the phase of said reference ignition timing signal.

2. An ignition timing control system as claimed in claim 1, wherein said detection means comprises switch means connected to said acceleration compensation circuit means and operable in response to the pressure in an intake manifold of the internal combustion engine in excess of a predetermined magnitude.

3. An ignition timing control system as claimed in claim 1, wherein said detection means comprises switch means connected to said acceleration compensation circuit means and operable in response to the degree of opening of a throttle valve operatively connected to the internal combustion engine in excess of a predetermined magnitude.

4. An ignition timing control system as claimed in claim 1, wherein said acceleration circuit compensation means includes a timer.

* * * * *